United States Patent
Geist et al.

(10) Patent No.: US 12,553,557 B2
(45) Date of Patent: Feb. 17, 2026

(54) AIR HOSE COUPLING IN AUTOMATED GLADHAND SYSTEM

(71) Applicant: Trackmobile LLC, LaGrange, GA (US)

(72) Inventors: James Geist, Inverness, IL (US); Phuc Nguyen, Papillion, NE (US); Jason Smid, Chicago, IL (US); Vince Difatta, Wood Dale, IL (US); Bob Evans, LaGrange, GA (US)

(73) Assignee: Trackmobile LLC, LaGrange, GA (US)

( * ) Notice: Subject to any disclaimer, the term of this patent is extended or adjusted under 35 U.S.C. 154(b) by 572 days.

(21) Appl. No.: 18/165,677

(22) Filed: Feb. 7, 2023

(65) Prior Publication Data

US 2023/0250910 A1      Aug. 10, 2023

Related U.S. Application Data

(60) Provisional application No. 63/307,602, filed on Feb. 7, 2022.

(51) Int. Cl.
*F16L 37/44* (2006.01)
*B61G 5/08* (2006.01)
*F16L 37/26* (2006.01)

(52) U.S. Cl.
CPC ............... *F16L 37/44* (2013.01); *B61G 5/08* (2013.01); *F16L 37/26* (2013.01)

(58) Field of Classification Search
CPC ........ B60D 1/64; B60T 17/043; F16L 37/256; F16L 37/44; F16L 37/26; B61G 5/08
See application file for complete search history.

(56) References Cited

U.S. PATENT DOCUMENTS

| 402,300 | A | * | 4/1889 | Campbell | ............... | F16L 37/32 |
| | | | | | | 137/614.04 |
| 2,460,137 | A | * | 1/1949 | Lindeman | ........... | F16L 55/1007 |
| | | | | | | 251/149.6 |

(Continued)

FOREIGN PATENT DOCUMENTS

| ES | 442136 A1 | * | 6/1977 | ............. | B61H 13/34 |
| FR | 2808863 A1 | * | 11/2001 | ............. | F16L 37/20 |

(Continued)

OTHER PUBLICATIONS

International Search Report dated Jun. 14, 2023 issued in Int'l. Application PCT/US2023/062122.

*Primary Examiner* — Paul N Dickson
*Assistant Examiner* — Maxwell L Meshaka
(74) *Attorney, Agent, or Firm* — Arnold & Porter Kaye Scholer LLP

(57) ABSTRACT

A gladhand device for automatically coupling the air brake hose of a railcar to a railcar mover is disclosed herein. The automated gladhand device may comprise a gladhand body that is attached to the end of a railcar mover and configured to receive the gladhand attached to an air brake hose of a railcar. In various embodiments, the gladhand device may comprise a piston housed within a lower portion of the gladhand body that is configured to extend vertically above a top edge of the lower portion of the gladhand body. When air pressure is allowed to enter the gladhand body via an electrically controlled solenoid, the piston presses against the gladhand of the air brake hose and pneumatically seals a coupling between the air brake hose of the railcar and the railcar mover.

16 Claims, 5 Drawing Sheets

(56) References Cited

U.S. PATENT DOCUMENTS

| | | | | |
|---|---|---|---|---|
| 2,758,611 | A * | 8/1956 | Michaels | F16L 37/36 |
| | | | | 285/364 |
| 3,241,865 | A * | 3/1966 | Pumphrey | F16L 37/256 |
| | | | | 285/914 |
| 3,245,553 | A * | 4/1966 | Cope | B61G 5/08 |
| | | | | 213/212 |
| 3,554,230 | A | 1/1971 | Berg et al. | |
| 3,599,803 | A * | 8/1971 | Cope | B61G 5/08 |
| | | | | 213/212 |
| 4,533,115 | A * | 8/1985 | Lissau | B60T 17/043 |
| | | | | 251/324 |
| 4,544,132 | A | 10/1985 | Allen et al. | |
| 5,129,243 | A * | 7/1992 | Kassebaum | F16L 37/256 |
| | | | | 70/237 |
| 5,383,691 | A * | 1/1995 | Anthony | F16L 37/1225 |
| | | | | 285/364 |
| 5,788,291 | A * | 8/1998 | Williams | F16L 37/26 |
| | | | | 285/325 |
| 6,062,609 | A * | 5/2000 | Chauvire | F16L 37/26 |
| | | | | 285/38 |
| D764,641 | S * | 8/2016 | Papafagos | D23/262 |
| 11,865,883 | B2 * | 1/2024 | Winograd | B60D 1/62 |
| 2019/0302764 | A1 | 10/2019 | Smith et al. | |
| 2020/0338942 | A1 * | 10/2020 | Winograd | B60D 1/62 |
| 2023/0046740 | A1 * | 2/2023 | Poulson | F16L 37/256 |
| 2023/0249719 | A1 * | 8/2023 | Geist | B61J 3/10 |
| | | | | 213/75 R |
| 2023/0250910 | A1 * | 8/2023 | Geist | B61G 5/08 |
| | | | | 251/148 |
| 2025/0290586 | A1 * | 9/2025 | Poulson | F16L 37/256 |

FOREIGN PATENT DOCUMENTS

| | | | | |
|---|---|---|---|---|
| WO | WO-2011042718 | A1 * | 4/2011 | F16L 37/22 |
| WO | WO 2023/019018 | A1 | 2/2023 | |

* cited by examiner

AIR HOSE COUPLING IN AUTOMATED GLADHAND SYSTEM

RELATED APPLICATIONS

This application claims priority to U.S. Provisional Patent Application No. 63/307,602, filed Feb. 7, 2022, the content of which is incorporated herein by reference in its entirety.

FIELD OF THE INVENTION

The present invention relates to the railway industry and, more particularly, to systems for coupling a railcar to another railcar or railway vehicle.

BACKGROUND OF THE INVENTION

Railcar movers provide a more efficient way to move rail cars around within a rail yard than using a locomotive for such tasks. A railcar mover is a machine capable of traveling on both roads and rail tracks to efficiently move rail cars. The ability to move on roads allows the railcar mover to maneuver within or around a rail yard without a need for clear track to transport rail cars. In order to perform its desired function, a railcar mover must frequently couple to and uncouple from rail cars to move the rail cars around a train yard or controlled facility. However, conventional techniques for coupling a railcar mover to a rail car suffer from numerous drawbacks.

The coupling process typically requires two steps: mechanical coupling and air hose coupling. Mechanical coupling allows the railcar mover to physically move the rail car or set of rail cars, while air hose coupling allows the railcar mover to control the brakes of the rail car or set of rail cars. Using conventional techniques, mechanical coupling can be accomplished from a remote location with air hose coupling performed manually by a railcar mover operator. This requires the operator to work between the rail car and the railcar mover, exposing the equipment and operator to the potential for dangers that arise from human error. Alternatively, air hose coupling may be foregone altogether when coupling a railcar mover and rail car. When this is done, the brakes of the railcar mover alone are relied on to stop a coupled car assembly. This creates further potential problems, as the brakes of the railcar mover alone may be insufficient.

The manipulation requirement imposed by conventional techniques for coupling an air hose of a rail car to a railcar mover presents additional drawbacks. Indeed, conventional devices exist that facilitate the mechanical and pneumatic coupling of a railcar mover and rail car. However, these conventional devices require the coupling be held in absolute position. In other words, conventional couplers must be manipulated in multiple dimensions simultaneously, which typically requires an operator to facilitate the coupling by hand. As such, in addition to an operator being required to physically hold the air hose in position, conventional techniques for coupling the air hose of a rail car to a railcar mover also require an operator to be manually present between the rail car and railcar mover to establish the connection between air hose and railcar mover itself.

As such, there is a need for a better way to couple a railcar mover to a rail car that eliminates the need for an operator to manually couple a railcar mover mechanically and pneumatically to the air hose of the rail car.

SUMMARY OF THE INVENTION

Aspects of this disclosure relate to various embodiments of a gladhand device for coupling the air brake hose of a railcar to another railcar or a railway vehicle, such as a railcar mover. In various embodiments, the automated gladhand device may comprise a gladhand body that is attached to an end of a railcar mover and configured to receive the gladhand attached to an air brake hose of a railcar. In various embodiments, the gladhand device may comprise a piston housed within a lower portion of the gladhand body that is configured to extend vertically above a top edge of the lower portion of the gladhand body. In various embodiments, air pressure is allowed to enter the gladhand body via an electrically controlled solenoid, thereby causing the piston to press against the gladhand of the air brake hose and pneumatically seal a coupling between the air brake hose of the railcar and the railcar mover. In some embodiments, the gladhand device may include or be connected to a motor configured to cause the piston to extend vertically independently of the air pressure allowed to enter the gladhand body. In other embodiments, the air pressure allowed to enter the gladhand body may be configured to cause the piston to extend vertically above the top edge of the lower portion of the gladhand body and towards the gladhand of the air brake hose. In various embodiments, the automated gladhand device described herein may be configured to pneumatically seal a coupling between the air brake hose of a railcar and a railcar mover without requiring rotation of the air brake hose and without requiring a crew member to manually couple the air brake hose of the railcar to the railcar mover.

These and other objects, features, and characteristics of the invention disclosed herein will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The present invention is illustrated by way of example and not limited in the accompanying figures in which like reference numerals indicate similar elements and in which.

These drawings are provided for purposes of illustration only and merely depict typical or example embodiments. These drawings are provided to facilitate the reader's understanding and shall not be considered limiting of the breadth, scope, or applicability of the disclosure. For clarity and ease of illustration, these drawings are not necessarily drawn to scale.

DETAILED DESCRIPTION OF THE INVENTION

In the following description of various examples of the invention, reference is made to the accompanying drawings, which form a part hereof, and in which are shown by way of illustration various example structures, systems, and steps in which aspects of the invention may be practiced. It is to be understood that other specific arrangements of parts, structures, example devices, systems, and steps may be utilized, and structural and functional modifications may be made without departing from the scope of the present invention. Also, while the terms "top," "bottom," "front," "back," "side," and the like may be used in this specification to describe various example features and elements of the invention, these terms are used herein as a matter of convenience, e.g., based on the example orientations shown in the figures. Nothing in this specification should be construed as requiring a specific three-dimensional orientation of structures in order to fall within the scope of this invention.

Railcar movers are machines capable of operation in road mode and rail mode. In road mode, the railcar mover utilizes a set of road wheels to drive freely. In rail mode, the railcar mover utilizes a set of rail wheels that engage the rail of a train track to move along the track. When the railcar mover arrives at a rail car or set of rail cars it will move, the railcar mover must couple to the rail car or set of rail cars. Coupling of the railcar mover to a rail car or set of rail cars comprises mechanical coupling and air hose coupling. The invention described herein relates to a device to be used in a gladhand system that improves the function, efficiency, and safety of a railcar mover by pneumatically sealing a coupling to the air hose of a rail car to allow the railcar mover to control the brakes of the rail car or set of rail cars as well as the brakes of the railcar mover itself.

Figure 1A:
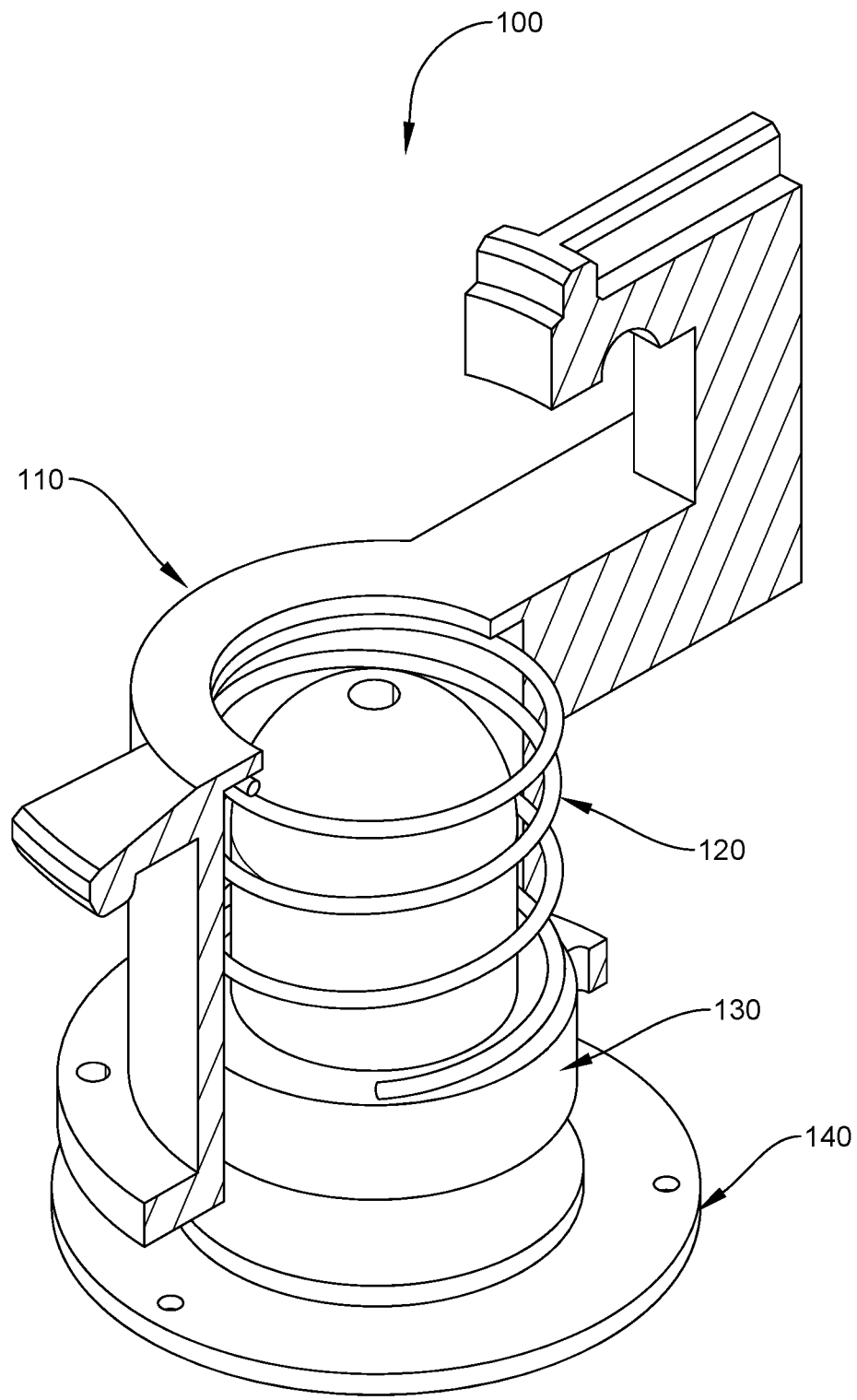
FIG. 1A depicts a perspective view of an example automated gladhand device, according to one or more aspects described herein.
Figure 1B:
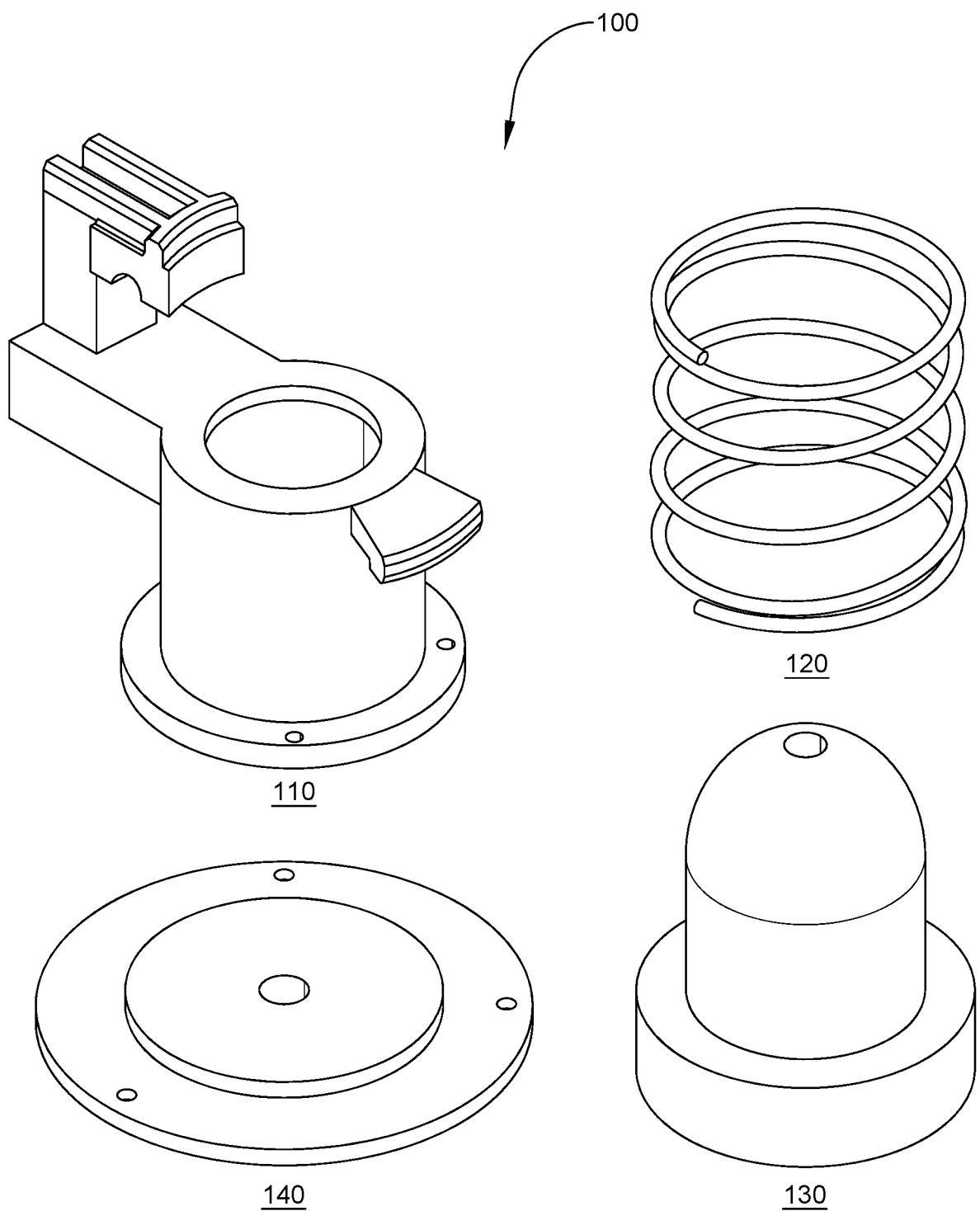
FIG. 1B depicts an exploded view of the example automated gladhand device depicted in FIG. 1A, according to one or more aspects described herein.

For example, FIG. 1A depicts a perspective view of an automated gladhand device 100, according to one or more aspects described herein. In various embodiments, automated gladhand device 100 may be configured to automatically provide a pneumatic and mechanical connection to a standard F-type gladhand for the purpose of supplying train air. FIG. 1B depicts an exploded view of automated gladhand device 100 depicted in FIG. 1A, according to one or more aspects described herein. In various embodiments, automated gladhand device 100 include a gladhand body 110, a piston 130, a cap 140, and/or one or more other components. In various embodiments, gladhand body 110 may be configured to receive a rail car air brake hose (e.g., rail car air brake hose 200) having a standard gladhand. In various embodiments, gladhand body 110 may be configured to be attached to an end of a railcar mover. For example, in some embodiments, gladhand body 110 may be configured to be attached to or beneath a bumper of a railcar mover. In various embodiments, gladhand body 110 may comprise an upper portion configured to attach to a railcar mover and a lower portion configured to house piston 130 and be positioned beneath the gladhand of rail car air brake hose. In various embodiments, the lower portion of gladhand body 110 may include a hole configured to house piston 130 within gladhand body 110. In various embodiments, piston 130 may be configured to extend vertically above a top edge of the lower portion of gladhand body 110. In some embodiments, automated gladhand device 100 may also include a spring 120. For example, spring 120 may comprise a compression spring positioned on piston 130, and both spring 120 and piston 130 may be inserted within gladhand body 110. In some embodiments, cap 140 may be configured to secure spring 120 and/or piston 130 within gladhand body 110, thus forming automated gladhand device 100. In embodiments without spring 120, piston 130 may be configured to extend and retract via air pressure entering automated gladhand device and/or via a motor, a pneumatic system, and/or other means by which movement of piston 130 may be powered and controlled. For example, in some implementations, the pneumatic system of the railcar mover brakes may be utilized to extend and/or retract piston 130 and/or hold it in place. In other embodiments, a separate pneumatic system independent from the railcar mover brakes may be provided and utilized to extend and/or retract piston 130 and/or hold it in place.

Figure 2A:
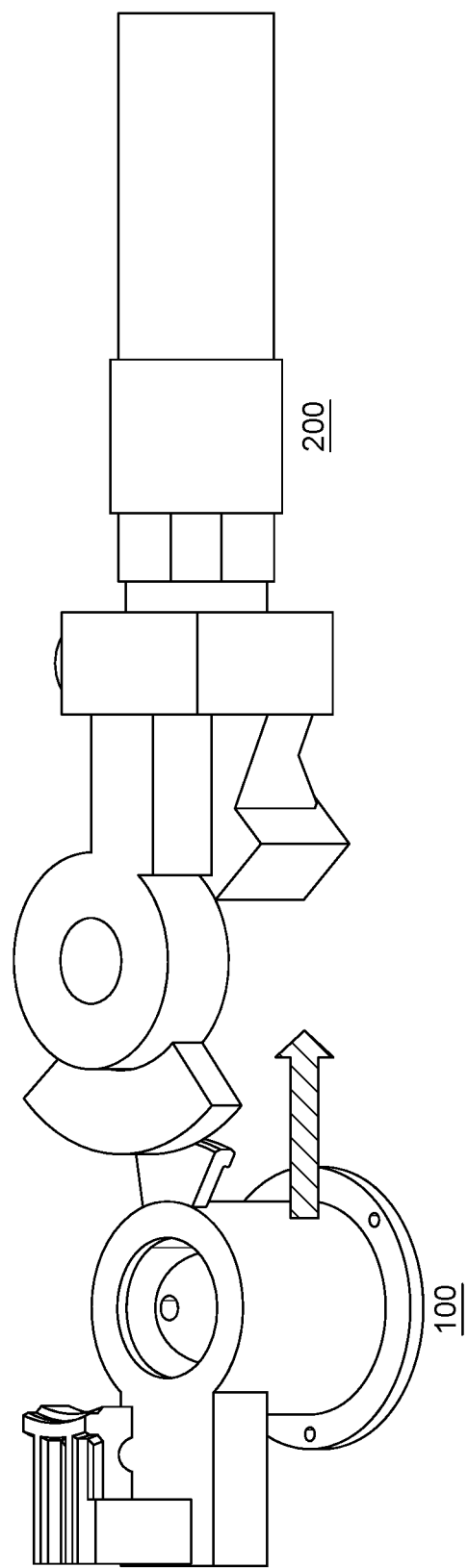
FIG. 2A depicts a perspective view of an example automated gladhand device and rail car air brake hose, according to one or more aspects described herein.
Figure 2B:
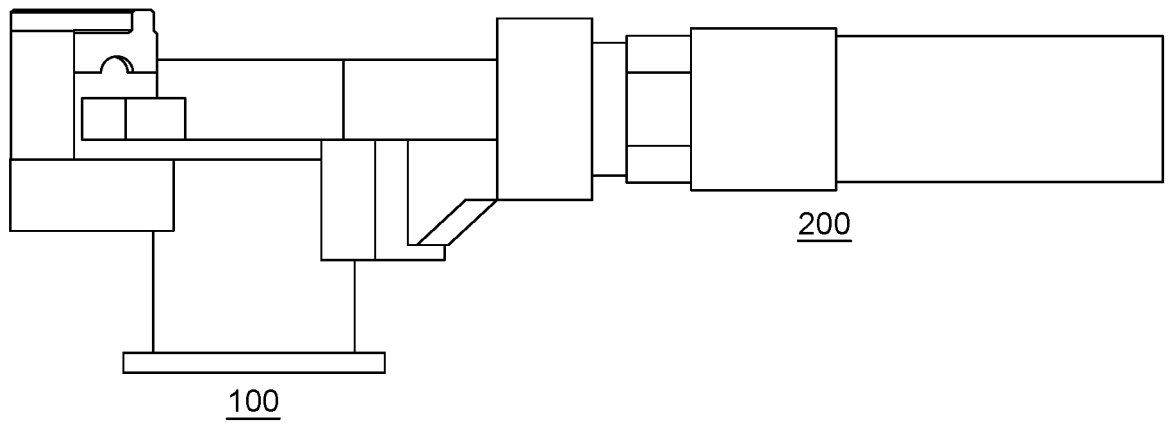
FIG. 2B depicts a side view of an example automated gladhand device and rail car air brake hose, according to one or more aspects described herein.
Figure 2C:
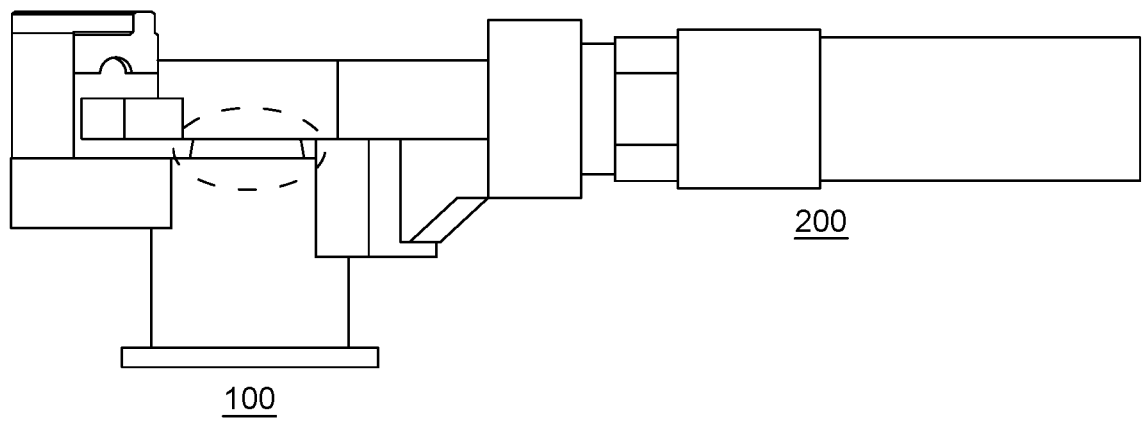
FIG. 2C depicts a side view of an example automated gladhand device mated with a rail car air brake hose, according to one or more aspects described herein.

FIG. 2A depicts a perspective view of automated gladhand device 100 and an example rail car air brake hose 200, according to one or more aspects described herein. As described herein, rail car air brake hose 200 may comprise a standard gladhand for mating with a gladhand found on a conventional railcar mover. In various embodiments, automated gladhand device 100 may be configured to be used in place of a standard manual F-type gladhand. For example, automated gladhand device 100 may be configured to be inserted into a standard gladhand-gladhand assembly. In various embodiments, automated gladhand device 100 may be configured to be inserted into a gladhand-gladhand assembly by sliding along an axis of air hose 200 instead of requiring the air hose to be aligned and twisted. For example, FIG. 2B depicts a side view of automated gladhand device 100 and a rail car air brake hose 200 in which automated gladhand device 100 is slid axially into position with a gladhand of a rail car air brake hose 200, according to one or more aspects described herein. When in line with the gladhand of rail car air brake hose 200, piston 130 inside automated gladhand device 100 extends to mate with a hole in the gladhand of rail car air brake hose 200. For example, FIG. 2C depicts a side view of automated gladhand device 100 in which piston 130 is extended into a hole in the gladhand of the rail car air brake hose 200, according to one or more aspects described herein. In some embodiments, piston 130 may be configured to extend with power from a motor or pneumatic system without, independent from, or prior to air pressure being applied. In some embodiments, piston 130 may be configured to be held in with power from a motor or pneumatic system without and/or prior to air pressure being applied. In some embodiments, an upper side of piston 130 may be dome-shaped (as depicted in at least FIGS. 1B, 2A, and 2C), have a flat surface, and/or comprise another type of surface or edge. In various embodiments, piston 130 may comprise an upper side with a flat surface in which piston 130 is configured to extend with the flat surface of piston 130 pressing against a seal on the gladhand of the rail car air brake hose 200. In various embodiments, an electronically controlled solenoid allows air pressure to enter automated gladhand device 100 or not, and piston 130 may be held back by spring 120. When the solenoid allows air pressure into automated gladhand device 100, piston 130 extends into the hole in the gladhand of air brake hose 200, producing an airtight seal and holding up air brake hose 200. When pressure is released, spring 120 causes piston 130 to retract within automated gladhand device 100, thereby releasing air brake hose 200. In embodiments without a spring 120, piston 130 may be configured to automatically retract within automated gladhand device 100 when pressure is released. In some embodiments, a motor or a pneumatic system may be included within or connected to automated gladhand device 100 and configured to cause piston 130 to retract within automated gladhand device 100 (e.g., when pressure is released.

As described herein, conventional F-type gladhand couplers require coupling to be performed by hand. For example, these connections typically require manipulation in multiple dimensions simultaneously. The automated gladhand device 100 described herein facilitates connection to an F-type gladhand with a sliding action (i.e., by being slid on an axis of a rail car air hose instead of requiring rotation), thereby permitting greater automation of the coupling process. In other words, automated gladhand device 100 enables a railcar mover to which the automated gladhand device 100 is attached to be coupled with a rail car air brake hose 200 without requiring rotation of the railcar air brake hose 200. The automated gladhand device 100 described herein also accommodates angular misalignments in all three degrees of angular freedom and all three degrees of linear freedom. Thus, all six degrees of freedom are accommodated. Furthermore, the automated gladhand device 100 described herein enables the automatic engagement and disengagement—both mechanically and pneumatically—by means of external control or in conjunction with the application of train air pressure. As a result, the invention described herein eliminates the need for a crew member to manually couple a railcar mover to a rail car, along with the dangers that come with it. In other words, automated gladhand device 100 enables a railcar mover to which the automated gladhand device 100 is attached to be coupled with a rail car air brake hose 200 without requiring a crew member to manually couple the railcar air brake hose 200 to the railcar mover. Additionally, the system described herein allows for decoupling while at full pressure by pulling away at similar forces to a standard F-type gladhand.

In some embodiments, the automated gladhand device described herein may be used with an assembly for mechanically coupling a railcar to a railcar mover (or other railway vehicle). For example, in some embodiments, automated gladhand device 100 may be utilized in conjunction with a claw system configured to facilitate the coupling (and decoupling) of a railcar from a railcar mover or other railway vehicle as described in co-pending U.S. patent application Ser. No. 18/165,520, entitled "MECHANICAL COUPLING IN AUTOMATED GLADHAND SYSTEM," filed Feb. 7, 2023, the content of which is hereby incorporated by reference herein in its entirety. In such embodiments, a claw assembly may be utilized to grasp the air brake hose of a railcar adjacent to a railcar mover on a set of tracks when that railcar is positioned within a proximity of the railcar mover (or other railway vehicle to which the claw assembly and automated gladhand device described herein are attached). In such embodiments, the set of arms and the set of claws of the claw assembly may be configured to move to grasp the air brake hose and bring it into position for coupling with the automated gladhand device described herein.

Figure 3:
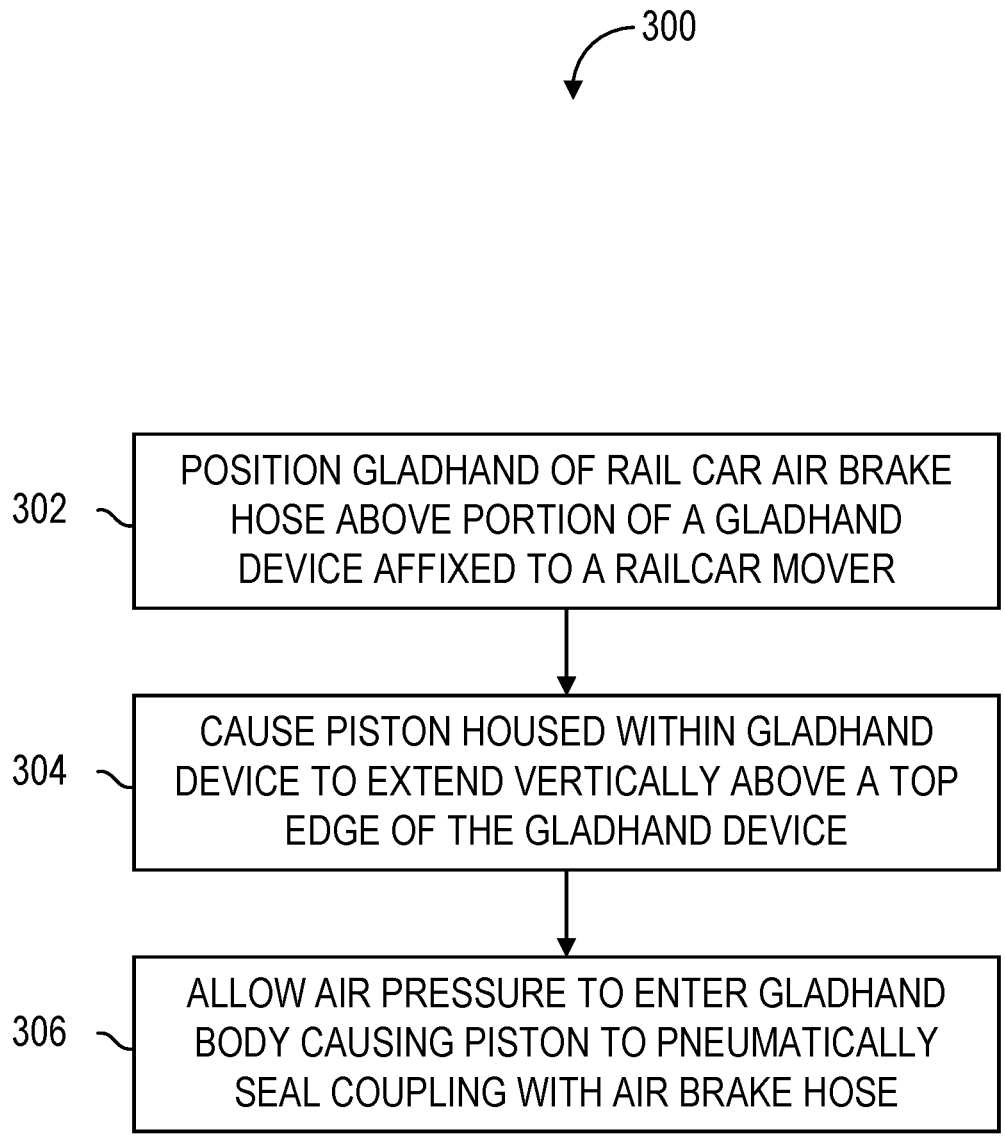
FIG. 3 depicts a flow diagram of an example method for using an automated gladhand device to couple a rail car air brake hose with a railcar mover or other railway vehicle, according to one or more aspects described herein.

FIG. 3 depicts a flow diagram of an example method 300 for using an automated gladhand device to couple a rail car air brake hose with a railcar mover or other railway vehicle, according to one or more aspects described herein. In various embodiments, method 300 may be performed using the same gladhand device or a gladhand device similar to automated gladhand device 100 described herein.

In an operation 302, process 300 may include positioning a gladhand of a rail car air brake hose above a portion of a gladhand device affixed to a railcar mover. In various embodiments, a gladhand of an air brake hose of a railcar may be positioned above a lower portion of a gladhand body of a gladhand device, such as automated gladhand device 100 described herein. In various embodiments, the gladhand body may be attached to an end of a railcar mover and may be configured to receive the gladhand of the air brake hose of the railcar.

In an operation 304, process 300 may include causing a piston housed within the gladhand device to extend vertically above a top edge of the gladhand device. In various embodiments, the piston housed within a lower portion of the gladhand body may be caused to extend vertically above a top edge of the lower portion of the gladhand body. In some embodiments, the air pressure allowed to enter the gladhand body (as described with respect to operation 306) may cause the piston housed within the lower portion of the gladhand body to extend vertically above the top edge of the lower portion of the gladhand body. In some embodiments, a motor included within or connected to the gladhand device may be configured to cause the piston housed within the lower portion of the gladhand body to extend vertically above the top edge of the lower portion of the gladhand body.

In an operation 306, process 300 may include allowing air pressure to enter gladhand body causing the piston to pneumatically seal a coupling with the air brake hose. In various embodiments, air pressure may be allowed to enter the gladhand body via an electrically controlled solenoid. Allowing the air pressure to enter the gladhand body may cause the piston to press against the gladhand of the air brake hose and pneumatically seal a coupling between the air brake hose of the railcar and the railcar mover. In various embodiments, the coupling between the air brake hose of the railcar and the railcar mover is pneumatically sealed without requiring rotation of the air brake hose. In various embodiments, the coupling between the air brake hose of the railcar and the railcar mover is pneumatically sealed without requiring a crew member to manually couple the air brake hose of the railcar to the railcar mover.

Notably, the system described herein may be used to connect a railcar mover to a railcar, as well as to connect a railcar to another railcar, a locomotive, and/or one or more other types of railway vehicles. Thus, in certain embodiments, the automated gladhand device described herein (i.e., automated gladhand device 100) may be attached to a railcar, a railcar mover, a locomotive, and/or one or more other types of railway vehicles.

It is to be understood that the invention is not limited in its application to the details of construction and the arrangement of the components set forth herein. The invention is capable of other embodiments and of being practiced or being carried out in various ways. Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

While the preferred embodiments of the invention have been shown and described, it will be apparent to those skilled in the art that changes and modifications may be made therein without departing from the spirit of the invention, the scope of which is defined by this description.

Reference in this specification to "one implementation", "an implementation", "some implementations", "various implementations", "certain implementations", "other implementations", "one series of implementations", or the like means that a particular feature, design, structure, or characteristic described in connection with the implementation is included in at least one implementation of the disclosure. The appearances of, for example, the phrase "in one implementation" or "in an implementation" in various places in the specification are not necessarily all referring to the same implementation, nor are separate or alternative implementations mutually exclusive of other implementations. Moreover, whether or not there is express reference to an "implementation" or the like, various features are described, which may be variously combined and included in some implementations, but also variously omitted in other implementations. Similarly, various features are described that may be preferences or requirements for some implementations, but not other implementations.

The language used herein has been principally selected for readability and instructional purposes, and it may not have been selected to delineate or circumscribe the inventive subject matter. Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. An automated gladhand device for coupling a railcar mover with an air brake hose on a railcar comprising:
    a gladhand body attached to an end of a railcar mover and configured to receive a gladhand attached to an air brake hose of a railcar;
    a piston housed within a lower portion of the gladhand body, wherein the piston is configured to extend vertically above a top edge of the lower portion of the gladhand body; and
    a cap attached to a base of the gladhand body and configured to secure the piston within the gladhand body,
    wherein an electrically controlled solenoid is configured to allow air pressure to enter the gladhand body when the gladhand of the air brake hose is positioned above the lower portion of the gladhand body, thereby causing the piston to press against the gladhand of the air brake hose and pneumatically seal a coupling with the air brake hose of the railcar.

2. The gladhand device of claim 1, wherein the air pressure entering the gladhand body causes the piston to extend vertically above a top edge of the lower portion of the gladhand body and towards the gladhand of the air brake hose.

3. The gladhand device of claim 1, wherein the gladhand device includes or is connected to a motor configured to cause the piston to extend vertically above a top edge of the lower portion of the gladhand body and towards the gladhand of the air brake hose.

4. The gladhand device of claim 1, wherein piston comprises an upper side with a flat surface configured to press against the gladhand of the air brake hose, thereby pneumatically sealing the coupling with the air brake hose of the railcar.

5. The gladhand device of claim 1, wherein the piston is configured to extend vertically into a hole in the gladhand of the air brake hose.

6. The gladhand device of claim 1, wherein the piston is configured to retract within the lower portion of the gladhand body when air pressure is released.

7. The gladhand device of claim 6, wherein the gladhand device includes a spring within the gladhand body, wherein the spring is configured to cause the piston to automatically retract within the lower portion of the gladhand body when air pressure is released.

8. The gladhand device of claim 6, wherein the gladhand device includes or is connected to a motor configured to cause the piston to retract within the lower portion of the gladhand body when air pressure is released.

9. The gladhand device of claim 1, wherein the gladhand device accommodates angular misalignments in all three degrees of angular freedom and all three degrees of linear freedom.

10. The gladhand device of claim 1, wherein the gladhand device causes the piston to pneumatically seal the coupling with the air brake hose of the railcar without requiring rotation of the air brake hose.

11. The gladhand device of claim 1, wherein the gladhand device causes the piston to pneumatically seal the coupling with the air brake hose of the railcar without requiring a crew member to manually couple the air brake hose of the railcar to the railcar mover.

12. A method for coupling a railcar mover with an air brake hose on a railcar using an automated gladhand device, the method comprising:
    positioning a gladhand of an air brake hose of a railcar above a lower portion of a gladhand body of a gladhand device, wherein the gladhand body is attached to an end of a railcar mover and is configured to receive the gladhand of the air brake hose of the railcar;
    causing a piston housed within the lower portion of the gladhand body to extend vertically above a top edge of the lower portion of the gladhand body; and
    allowing air pressure to enter the gladhand body via an electrically controlled solenoid, thereby causing the piston to press against the gladhand of the air brake hose and pneumatically seal a coupling between the air brake hose of the railcar and the railcar mover.

13. The method of claim 12, wherein the air pressure allowed to enter the gladhand body causes the piston housed within the lower portion of the gladhand body to extend vertically above the top edge of the lower portion of the gladhand body.

14. The method of claim 12, the method further comprising causing the piston housed within the lower portion of the gladhand body to extend vertically above the top edge of the lower portion of the gladhand body via a motor included within or connected to the gladhand device.

15. The method of claim 12, wherein the coupling between the air brake hose of the railcar and the railcar mover is pneumatically sealed without requiring rotation of the air brake hose.

16. The method of claim 12, wherein the coupling between the air brake hose of the railcar and the railcar mover is pneumatically sealed without requiring a crew member to manually couple the air brake hose of the railcar to the railcar mover.

* * * * *